US009253265B2

(12) United States Patent
Kuppala et al.

(10) Patent No.: US 9,253,265 B2
(45) Date of Patent: Feb. 2, 2016

(54) HOT PLUGGABLE EXTENSIONS FOR ACCESS MANAGEMENT SYSTEM

(71) Applicant: Oracle International Corporation, Redwood Shores, CA (US)

(72) Inventors: Siva Sundeep Kuppala, Tadepalligudem (IN); Sudhamsh Goutham Teegala, Miryalaguda (IN); Mrudul Pradeep Uchil, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/535,208

(22) Filed: Nov. 6, 2014

(65) Prior Publication Data

US 2015/0067167 A1    Mar. 5, 2015

Related U.S. Application Data

(63) Continuation of application No. 13/674,758, filed on Nov. 12, 2012, now Pat. No. 8,910,138.

(60) Provisional application No. 61/650,586, filed on May 23, 2012.

(51) Int. Cl.
```
G06F 9/44      (2006.01)
H04L 29/08     (2006.01)
G06F 9/445     (2006.01)
G06F 9/455     (2006.01)
```

(52) U.S. Cl.
CPC .......... H04L 67/16 (2013.01); G06F 9/44526 (2013.01); G06F 9/45533 (2013.01)

(58) Field of Classification Search
None
See application file for complete search history.

(56) References Cited

U.S. PATENT DOCUMENTS

| 5,815,718  | A     | 9/1998  | Tock |
| 6,701,334  | B1    | 3/2004  | Ye et al. |
| 6,738,977  | B1    | 5/2004  | Berry et al. |
| 6,813,762  | B1    | 11/2004 | Plaxton |
| 6,851,111  | B2    | 2/2005  | McGuire et al. |
| 6,871,345  | B1    | 3/2005  | Crow et al. |
| 7,197,511  | B2    | 3/2007  | Bracha et al. |
| 7,254,814  | B1 *  | 8/2007  | Cormier ............. G06F 9/44526 717/120 |
| 7,434,215  | B2    | 10/2008 | Boykin et al. |
| 7,441,020  | B2    | 10/2008 | Dideriksen et al. |

(Continued)

OTHER PUBLICATIONS

Notice of Allowance for U.S. Appl. No. 13/674,758 mailed on Aug. 6, 2014, 14 pages.

(Continued)

*Primary Examiner* — Chameli Das
(74) *Attorney, Agent, or Firm* — Kilpatrick Townsend & Stockton LLP

(57) ABSTRACT

Embodiments described herein relate to extending the functionality of one or more access management servers, using plug-in files which may be uploaded while the servers are running. The plug-in files may be discovered in both the plug-in file's own class path and the server's class path, and then may be used in the server's authentication and other operations. In certain embodiments, the server's class path need not be modified during this process, and the server need not be shut down or restarted. Certain embodiments may implement a parallel class loader. Custom plug-in file code may be loaded by the parallel class loader, and the parallel class loader is started a container class loader may be made the parent of the parallel class loader.

20 Claims, 7 Drawing Sheets

(56) References Cited

U.S. PATENT DOCUMENTS

| | | |
|---|---|---|
| 7,640,348 B2 | 12/2009 | Atwal et al. |
| 7,752,637 B2 | 7/2010 | Gunduc et al. |
| 2002/0049719 A1 | 4/2002 | Shiomi et al. |
| 2002/0184226 A1* | 12/2002 | Klicnik ............... G06F 9/44526 |
| 2003/0061404 A1* | 3/2003 | Atwal et al. .................. 709/328 |
| 2003/0074360 A1* | 4/2003 | Chen ......................... G06F 8/60 |
| 2003/0110312 A1* | 6/2003 | Gunduc et al. ............... 709/328 |
| 2004/0267940 A1* | 12/2004 | Dideriksen et al. ........... 709/228 |
| 2005/0060698 A1* | 3/2005 | Boykin et al. ................ 717/166 |
| 2005/0251809 A1* | 11/2005 | Gunduc et al. ............... 719/310 |
| 2006/0095919 A1 | 5/2006 | Shiomi et al. |
| 2006/0123067 A1 | 6/2006 | Ghattu et al. |
| 2007/0256055 A1 | 11/2007 | Herscu |
| 2008/0040322 A1* | 2/2008 | Rucker ............. G06F 17/30896 |
| 2008/0235710 A1* | 9/2008 | Challenger et al. ........... 719/316 |
| 2009/0158099 A1* | 6/2009 | Cui .................... G06F 11/0748 714/57 |
| 2010/0005509 A1* | 1/2010 | Peckover ................ G06F 21/10 726/3 |
| 2010/0031256 A1* | 2/2010 | Hsieh ............................... 718/1 |
| 2011/0023020 A1 | 1/2011 | Atsatt |
| 2011/0145334 A9* | 6/2011 | Colson et al. ................. 709/206 |
| 2012/0174084 A1 | 7/2012 | Chapman et al. |
| 2013/0080930 A1* | 3/2013 | Johansson ..................... 715/760 |
| 2013/0117848 A1* | 5/2013 | Golshan ................. G06F 21/00 726/23 |
| 2015/0228020 A1* | 8/2015 | Ram ...................... G06Q 30/08 705/37 |

OTHER PUBLICATIONS

Non-Final Office Action for U.S. Appl. No. 13/674,758 mailed on Apr. 24, 2014, 10 pages.

"Introducing ATMI Security," BEA Systems (2011) available at: http://download.oracle.com/docs/cd/E12531_01/tuxedo100/sec/secovr.html#wp1248107.

"Tivoli® Access Manager for e-business Release Notes Version 6.0," IBM Corp (Oct. 2005) available at: http://publib.boulder.ibm.com/infocenter/tivihelp/v2r1/topic/com.ibm.itame.doc_6.0/relnotes.pdf.

"GStreamer 1.0 Core Reference Manual," (no date) downloaded Sep. 8, 2011 from: http://gstreamer.freedesktop.org/data/doc/gstreamer/head/gstreamer/html/gstreamer-Gst.html.

"Cisco NAC Appliance Clean Access Manager Installation and Configuration Guide, Release 4.1(2): Configuring Network Scanning," Cisco Systems, Inc. (2008). Available at: http://www.cisco.com/en/US/docs/security/nac/appliance/configuration_guide/412/cam/m_netsca.html.

"Novell Access Manager 3.0 SP1 IR3 Readme," Novell, Inc. (2007). Available at: http://www.novell.com/documentation/novellaccessmanager/readme/accessmanager_readme_sp1.html.

* cited by examiner

HOT PLUGGABLE EXTENSIONS FOR ACCESS MANAGEMENT SYSTEM

CLAIM OF PRIORITY

This application claims priority under 35 U.S.C. §120 as a continuation of U.S. application Ser. No. 13/674,758, filed Nov. 12, 2012, titled "HOT PLUGGABLE EXTENSION FOR ACCESS MANAGEMENT SYSTEM", which claims priority under 35 U.S.C. §119(e) to U.S. Provisional Patent Application Ser. No. 61/650,586, titled "HOT PLUGGABLE EXTENSIONS FOR ACCESS MANAGEMENT SYSTEM," filed May 23, 2012, the entire contents of which are incorporated by reference herein.

FIELD OF THE INVENTION

The invention relates generally to secured computing, and more generally to access management for computing systems.

BACKGROUND

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those to whom he reports.

Earlier less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular resource. Upon making a determination that access should be granted, a token is provided to the requestor. This token is like a key that can be used to open a door that guards restricted data.

For example, a user may attempt to access a human resources database to gather information about certain employees such as salary information. The user's web browser makes a request to the application, which requires authentication. If the web browser does not have a token, the user is asked to log in to the access management system. When the user is authenticated, the user's browser receives a cookie that represents a token that may be used to access the human resources application.

An access management system may provide single sign on, authentication, authorization, and auditing features. Some releases of access management systems have a specific set of features that include authentication modules, authorization conditions, etc. These features are shipped with the access management system software "out of the box." However, users of access management system software often desire features beyond those that are shipped with the access management system software. These users may desire customized authentication or authorization modules that are not shipped with the access management system software, for example.

Typically, while an access management system server is up and running, it is desirable to leave it up and running Access management systems are supposed to be highly available. It is undesirable to take down the live access management system server for any reason. The undesirability of shutting down such a server even temporarily makes it inopportune to perform tasks, such as access management system software updates, that would typically require the server to be shut down at least temporarily.

DETAILED DESCRIPTION

Figure 1:
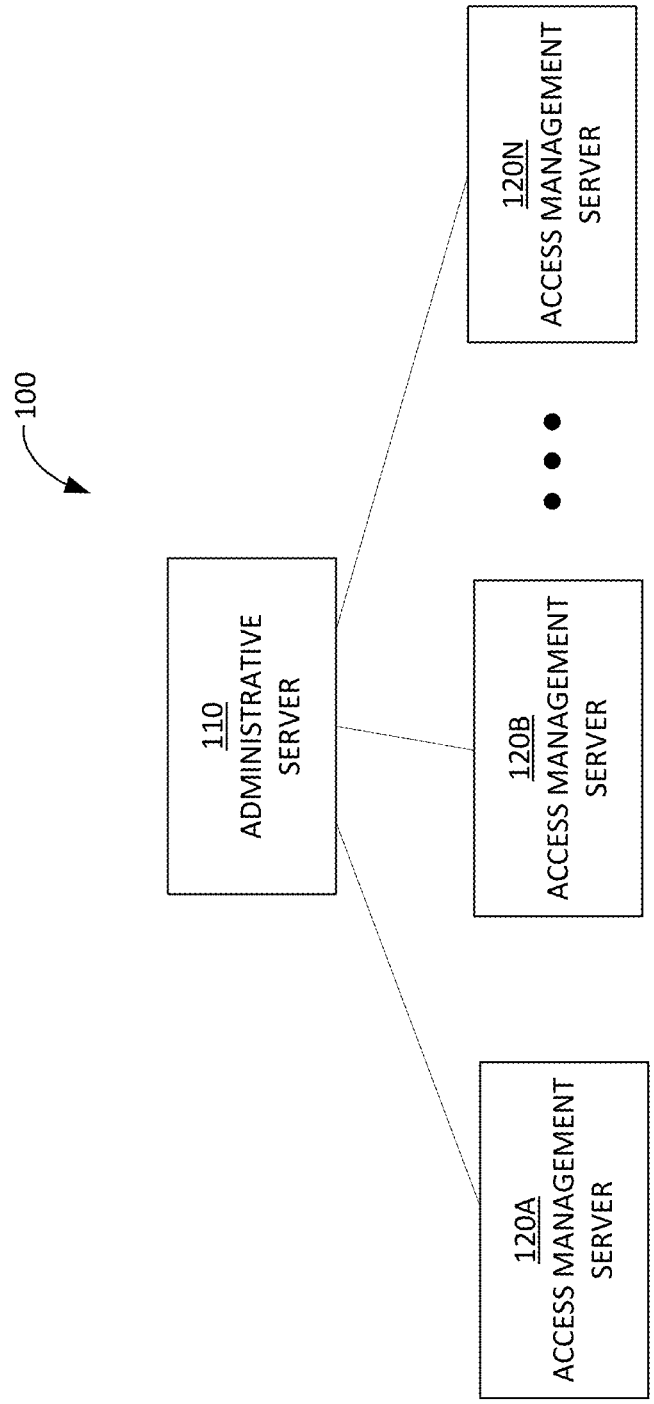
FIG. 1 is a block diagram that illustrates an example server cluster, according to an embodiment of the invention.

In the following description, for the purposes of explanation, specific details are set forth in order to provide a thorough understanding of embodiments of the invention. However, it will be apparent that the invention may be practiced without these specific details.

General Overview

Users desire a "hook" by which they can plug in their own authentication modules or other kinds of modules into an existing server product while that server is running Users further want to be able to plug in a JAVA jar file in that server without requiring the server to be taken down or deactivated (i.e., a "hot" plug in). Embodiments of the invention allow a plug-in jar file, which contains the code necessary for extending the functionality of an access management server, to be uploaded while the server is still running The foreign plug-in jar file is added in a class path of its own. The server subsequently recognizes the additional component, even though the plug-in jar file is not in the server's class path. The plug-in jar file is discovered in both the plug-in jar file's class path and the server's class path, and is then able to be used in the server's authentication and other operations. In one embodiment of the invention, the server's class path is not modified during this process, and, consequently, the server does not need to be shut down or restarted, which otherwise would be required in order to cause a server to recognize, at run time, a modified class path.

According to one embodiment of the invention, changes are made to the class-loading pattern of the JAVA Virtual Machine (JVM). The class-loading pattern determines how the classes are loaded. Whenever the JVM starts, the JVM's own class loader component loads the classes. Certain embodiments of the invention implement a parallel class loader. Custom plug-in jar file code is loaded by the parallel class loader. When the parallel class loader is started, a container class loader is made the parent of the parallel class loader. Because the custom plug-in jar file is loaded in a parallel system in the JVM, the other classes at that point are still unaware of the classes within that plug-in jar file. However, because embodiments of the invention cause the container class loader to become a super class of the parallel class loader, a connection can be made from the parallel class loader to the parent container class loader. Consequently, components loaded by the parallel class loader become recognized by the parent container class loader.

Extensibility Framework for Creating Custom Features

Users of access management system servers desire to be able to add plug-ins, or server extensions, to those servers. Users further desire to be able to use such plug-ins to create features additional to those that came shipped "out of the box" with the access management system software. Users further desire to be able to build such features and workflows using modules that came shipped "out of the box" with the access management system software. Users further desire to be able to add, to the access management system server, plug-ins that act as extension modules to the server. Furthermore, users desire to be able to do all of the above without incurring any server downtime. It is desirable for each such plug-in to have a state lifecycle that ensures security of the server environment, which could be a JAVA Virtual Machine (JVM), for example. It is desirable for each such plug-in to be easily manageable in a clustered environment.

In one embodiment of the invention, a clustered environment includes an administration server and one or more managed server nodes. In one embodiment of the invention, a shared memory infrastructure enables an event listener model for communication and transfer of code components among the server nodes in the clustered environment. In one embodiment of the invention, an Open Services Gateway Initiative (OSGI) framework implementation dynamically and securely loads and unloads plug-in code into the server environment, which, as discussed above, may be a JVM. The OSGI framework is a module system and service platform for the JAVA programming language. The OSGI framework implements a complete and dynamic component model, which typically does not exist in standalone JVM environments. Applications or components (coming in the form of bundles for deployment) can be remotely installed, started, stopped, updated, and uninstalled without requiring a reboot. Application life cycle management (start, stop, install, etc.) can be performed via application programming interfaces that allow for the remote downloading of management policies. A service registry allows bundles to detect the addition of new services, or the removal of services, and adapt accordingly.

In cases in which the server environment is a JVM, the plug-in code may take the form of a JAVA jar file. According to an embodiment of the invention, in order to accomplish the dynamic and secure loading and unloading of JAVA jar file plug-ins, the OSGI framework implementation includes a separate class loader per jar file plug-in.

Certain embodiments of the invention include an extensibility framework that enables access management system server users to write their own customized server features as plug-ins. The framework further enables these users to plug those customized plug-ins into the server. It is desirable to manage the "life cycle" of these customized plug-ins. Therefore, certain embodiments of the invention enable customized plug-ins, such as customized authentication modules, to be plugged in to the access management system. Certain embodiments of the invention enable the access management system to load or add such plug-ins into the system and to use those plug-ins without requiring the access management system to be restarted. Certain embodiments of the invention define and use startup parameters or other configuration data for such plug-ins. Certain embodiments of the invention enable such configuration data to be pushed into a configuration store or pulled from a configuration store. Certain embodiments of the invention propagate plug-in jar files from a single administrative server to each one of a plurality of access management system servers in a server cluster, all without incurring any server downtime. Certain embodiments of the invention maintain a complete state lifecycle of each such access management server. Certain embodiments of the invention enable data representing such lifecycles to be propagated from the access management servers to the administrative server.

FIG. 1 is a block diagram that illustrates an example server cluster, according to an embodiment of the invention. Server cluster 100 includes an administrative server 110 and access management servers 120A-N. Each of access management servers 120A-N communicates over a network or other communication channel with administrative server 110. Access management servers 120A-N propagate plug-in jar files to administrative server 110. Access management servers 120A-N also propagate data representative of lifecycles of those servers to administrative server 110. Each of access management servers 120A-N may include one or more user-customized plug-ins. In one embodiment of the invention, the configuration store resides on administrative server 110.

Custom Class Loading

In one embodiment of the invention, a custom class-loading technique is used to dynamically load and activate customized plug-in jar files on each of access management servers 120A-N. In one embodiment of the invention, this custom class-loading technique is implemented using an OSGI framework. A default activator may be provided as a part of a lifecycle management framework for each of access management servers 120A-N.

In one embodiment of the invention, before a plug-in is deemed to be usable on one of access management servers 120A-N, that plug-in undergoes a series of tests or checks. Each test or check involves a condition. Unless the plug-in satisfies the condition, the plug-in does not pass the test or check that involves that condition. In one embodiment of the invention, if a plug-in fails any of the tests of checks in the series, then the plug-in is not deemed to be usable, and is not used.

In one embodiment of the invention, the series of tests or checks involves a series of conditions as follows. The first condition requires that the plug-in has been validated for security risks and compatibility issues. The second condition requires that the plug-in is present on all of access management servers 120A-N. In one embodiment of the invention, a plug-in becomes present on access management servers 120A-N through the distribution of that plug-in from administrative server 110. The third condition requires that the plug-in has been loaded, or activated, on all of access managements servers 120A-N after being distributed to those access management servers 120A-N.

Traditionally, a container class loader of the JVM was the only class loader. However, in one embodiment of the invention, the container class loader is made a parent of a parallel class loader. The parallel class loader loads classes in parallel to the container class loader. The parallel class loader does not need to be restarted, as its parent is the container class loader. The parallel class loader is started with the container class loader as its parent. After the parallel class loader has loaded the desired classes from a customized plug-in jar file, the parallel class loader is instructed to overlay itself on its parent.

In one embodiment of the invention, the parallel class loader runs concurrently with the parent container class loader. The parallel class loader can load jar files "on the fly." When the parallel class loader does so, the parallel class loader becomes a part of the parent container class loader so that the loaded classes can be introduced to other classes used by access management servers 120A-N. Once the parallel class loader loads the classes, the parallel class loader is made a child of the parent container class loader.

In one embodiment of the invention, the parallel class loader initially starts running from the parent class loader, but has the ability to run separately and in parallel with the parent class loader. Once the parallel class loader has finished loading all of the classes, it hands control back to the parent container class loader. The parallel class loader essentially gives control back to the parent container class loader and becomes part of the parent container class loader itself.

Afterwards, if another plug-in needs to be added, the parallel class loader can once again be run separately and in parallel with the parent container class loader. After the parallel class loader has finished loading classes, the parallel class loader once again becomes a part of the parent container class loader.

Figure 4:
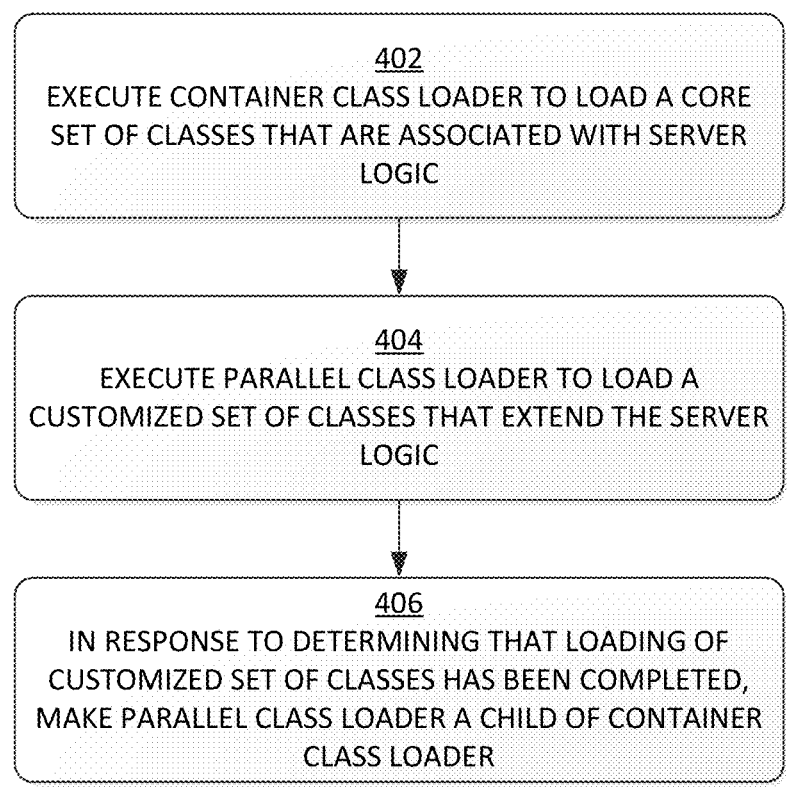
FIG. 4 is a flow diagram that illustrates a technique for custom class loading, according to an embodiment of the invention.

FIG. 4 is a flow diagram that illustrates a technique 400 for custom class loading, according to an embodiment of the invention. In block 402, a container class loader is executed to load a core set of classes that are associated with server logic. In block 404, a parallel class loader is executed, in parallel with the container class loader, to load a customized set of classes that extend the server logic. In one embodiment of the invention, the container class loader is associated with a different class path than a class path with which the parallel class loader is associated. In block 406, in response to a determination that the loading of the customized set of classes has been completed, the parallel class loader is made a child of the container class loader. In one embodiment of the invention, the customized set of classes becomes accessible to the core set of classes after the parallel class loader is made a child of the container class loader. In one embodiment of the invention, all of the foregoing operations of technique 400 are performed without restarting the server that is associated with the server logic; the customized set of classes become accessible to the core set of classes before the server is restarted, if the server is restarted at all.

In one embodiment of the invention, after the parallel class loader has been made a child of the parent container class loader, a second parallel class loader is executed to load a second set of customized classes that extend the server logic. In response to a determination that the loading of the second customized set of classes has been completed, the second parallel class loader is also made a child of the container class loader.

Plug-In Life Cycle States

In one embodiment of the invention, each plug-in has a life cycle. Commands which influence a plug-in's lifecycle include: upload, distribute, activate, deactivate, and remove. Additionally, in one embodiment of the invention, each plug-in has a certain state at any given time; the states collectively describe the plug-in's life cycle. Commands may causes a plug-in to leave one state and enter a different state in the plug-in's life cycle.

Figure 2:
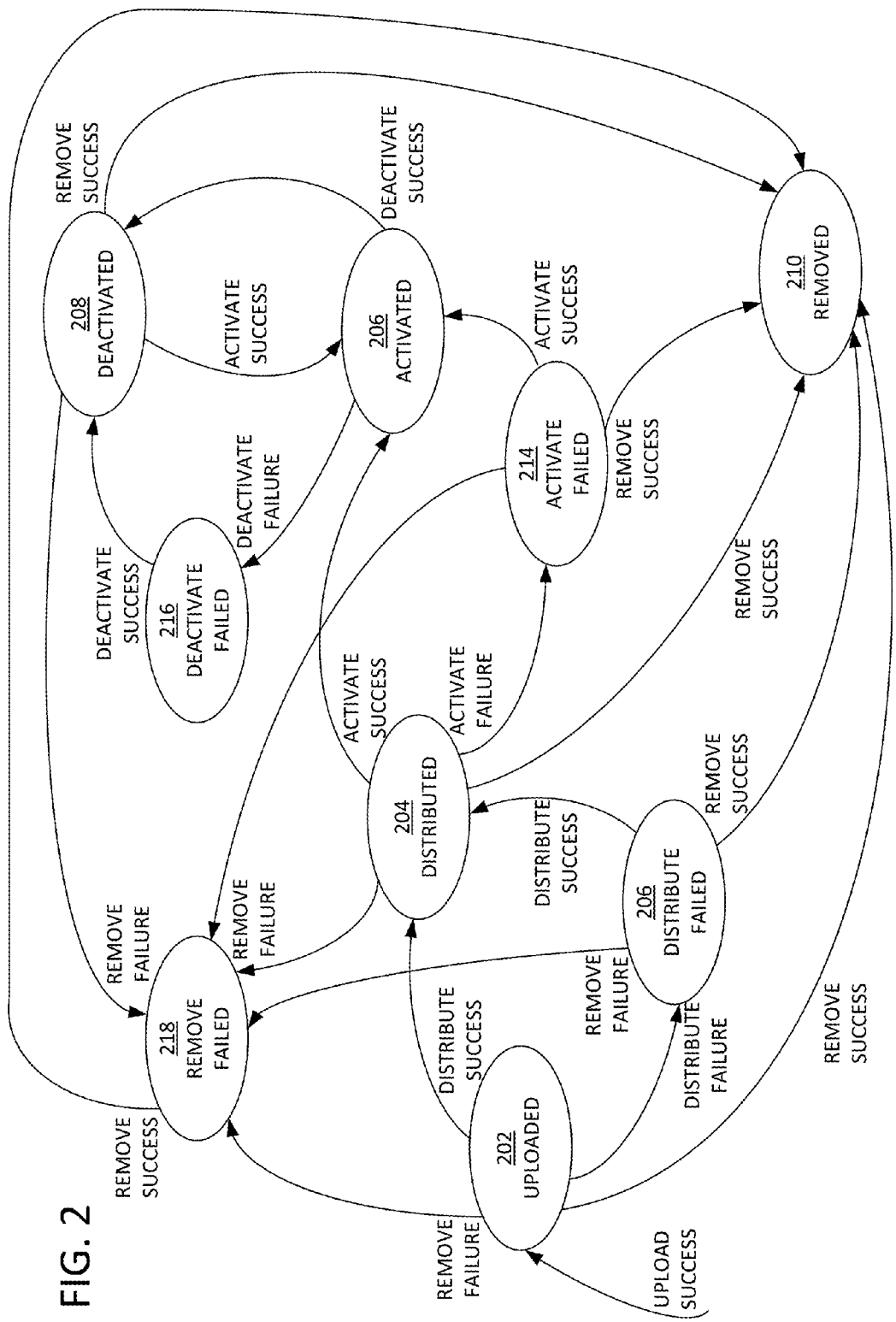
FIG. 2 is a state diagram that illustrates an example of the states in a plug-in's life cycle and the commands that may be used to cause a plug-in to transition from certain states to other certain states, according to an embodiment of the invention.

FIG. 2 is a state diagram that illustrates an example of the states in a plug-in's life cycle and the commands that may be used to cause a plug-in to transition from certain states to other certain states, according to an embodiment of the invention. A plug-in life cycle 200 includes states 202-218. These states include uploaded 202, distributed 204, activated 206, deactivated 208, removed 210, distribute_failed 212, activate_214, deactivate_failed 216, and remove_failed 218. Transitions from one state to another state are governed by the issuance of various different commands and the successes or failures of those commands.

Uploaded state 202 serves as the starting point for the plug-in life cycle. Uploaded state 202 is reached as a result of the successful invocation and performance of the "upload" command. When a plug-in is in uploaded state 202, it means that the plug-in jar file is present within a plug-in repository, which may reside within administrative server 110. The "remove" and "distribute" commands may be issued to plug-ins that are in uploaded state 202.

When a plug-in is in distributed state 204, it means that instances of the plug-in jar file are present and available on all of access management servers 120A-N (i.e., the plug-in has been distributed from administrative server 110 to all of access management servers 120A-N). Distributed state 204 can be reached from uploaded state 202 after a successful performance of the "distribute" command or from distribute_failed state 212 after a successful performance of the "distribute" command. The "activate" and "remove" commands may be issued to plug-ins that are in distributed state 204.

When a plug-in is in distribute_failed state 212, it means that an issued "distribute" command has failed relative to one or more instances of that plug-in on access management servers 120A-N. Distribute_failed state 212 can be reached from uploaded state 202. The "remove" and "distribute" commands may be issued to plug-ins that are in distribute_failed state 212.

When a plug-in is in activated state 206, it means that instances of the plug-in have been loaded into the JVM of all of access management servers 120A-N. In one embodiment of the invention, each plug-in is associated with a separate class loader that is specific to that plug-in. In one embodiment of the invention, plug-ins are loaded by the OSGI framework implementation. A plug-in that is in activated state 206 is available as an extension for use on the access management servers on which it resides. Activated state 206 can be reached from distributed state 204 after a successful performance of the "activate" command. Activated state 206 also can be reached from deactivated state 208 after a successful performance of the "activate" command. Activated state 206 also can be reached from activate_failed state 214 after a successful performance of the "activate" command. In one embodiment of the invention, while a plug-in is in activated state 206, that plug-in cannot be removed, because that plug-in might be in use in some extended module. Therefore, before the plug-in can be removed, the plug-in is deactivated. After deactivation, a removal attempt triggers checks to determine whether the plug-in is being used by any extended modules, and removal is allowed to proceed only if the plug-in is not being so used. Therefore, the "deactivate" command can be issued relative to a plug-in that is in activated state 206.

When a plug-in is in activate_failed state 214, it means that an issued "activate" command has failed relative to one or more instances of that plug-in on access management servers 120A-N. Activate_failed state 214 can be reached from distributed state 204. The "remove" and "activate" commands may be issued to plug-ins that are in activate_failed state 214.

When a plug-in is in deactivated state 208, it means that the plug-in has been unloaded from the JVM of all of access management servers 120A-N. The OSGI framework implementation-maintained class loader that specifically corresponds to that plug-in is used to unload the plug-in. Although deactivated state 208 is somewhat similar to distributed state 204, in deactivated state 208 OSGI implementations may contain the plug-in code in their caches because the plug-in has already been activated at least once. Deactivated state 208 can be reached from activated state 206 after successful performance of the "deactivate" command. Deactivated state 208 can be reached from deactivate_failed state 216 after successful performance of the "deactivate" command. A plug-in in the "deactivated" state can be removed or activated again, so the "activate" and "remove" commands may be issued to plug-ins that are in deactivated state 208.

When a plug-in is in deactivate_failed state 216, it means that an issued "deactivate" command has failed relative to one or more instances of that plug-in on access management servers 120A-N. Deactivate_failed state 216 can be reached from activated state 206. The "deactivate" command may be issued to plug-ins that are in deactivate_failed state 216, because the plug-in may be in an inconsistent state, and ought to be deactivated before it is removed.

When a plug-in is in removed state 210, it means that the plug-in is present only in a backup directory of administration server 110, and has been removed from all of access management servers 120A-N. Removed state 210 is the end state in a plug-in's lifecycle, and can be reached by a successful performance of the "remove" command from any of the other states except for activated state 206 and deactivate_failed state 216. In one embodiment of the invention, no further commands are permitted relative to a plug-in that is in removed state 210.

When a plug-in is in remove_failed state 212, it means that an issued "remove" command has failed relative to one or more instances of that plug-in on access management servers 120A-N. Remove_failed state 216 can be reached by an unsuccessful performance of the "remove" command from any of the other states except for activated state 206 and deactivate_failed state 216. The "remove" action can be performed relative to plug-ins that are in remove_failed state 216.

Transitioning Commands

The "upload" command imports a plug-in jar file to the system (specifically, in one embodiment of the invention, administrative server 110) and validates that file. The "upload" command causes the plug-in to be checked for compatibility, versioning, and potential security risks. After successful validation of the plug-in, a master entry for the plug-in is made in the configuration store. The state of the plug-in indicates uploaded state 202 at this point. This task takes place on administrative server 110. Access management servers 120A-N are unaffected. No command messages are sent to or by access management servers 120A-N using the messaging mechanism discussed below. The only resulting state for the "upload" command is uploaded state 202. Any failure in validation or importing of the plug-in prevents the creation of an entry in the configuration store, so no failure state is required.

The "distribute" command can be invoked relative to a plug-in if that plug-in is in uploaded state 202 or distribute_failed state 216. The plug-in code is distributed to access management servers 120A-N using a distribution mechanism discussed below. The "distribute" command does not cause any messages to be sent from administrative server 110 to any of access management servers 120A-N. Access management servers 120A-N, in response to the "distribute" command, copy the plug-in code using the distribution mechanism discussed below, and return to administrative server 110 either a "distribute success" or "distribute_failed" message depending on whether the copying was successful or not. After administrative server 110 receives "distribute success" messages from all of the operating access management servers 120A-N in cluster 100, administrative server 110 updates the status of the plug-in to distributed state 204 in the configuration store. If even one of access management servers 120A-N returns a "distribute_failed" message, administrative server 110 sets the status of the plug-in to be distribute_failed state 212.

The "activate" command can be invoked relative to a plug-in if that plug-in is in distributed state 204, activate_failed state 214, or deactivated state 208. In response to this command, administrative server 110 check the current operational status of access management server 120A-N in cluster 100. In one embodiment of the invention, for this command to complete successfully, at least one such access management server needs to be currently operational (up and running) Administrative server 110 sends an "activate" command to access management servers 120A-N using the messaging mechanism discussed below. Access management servers 120A-N then load the plug-in code into their JVMs using a separate class loader for each plug-in using the OSGI framework implementation. Upon successful loading and activation of the plug-in, an access management server sends an "activate success" message to administrative server 110. After administrative server 110 receives "activate success" messages from all of the operating access management servers 120A-N in cluster 100, administrative server 110 updates the status of the plug-in to activated state 206 in the configuration store. If even one of access management servers 120A-N returns an "activate failed" message, administrative server 110 sets the status of the plug-in to be activate_failed state 214.

The "deactivate" command can be invoked relative to a plug-in if that plug-in is in activated state 206 or deactivate_failed state 216. In response to this command, administrative server 110 check whether the plug-in is currently being used by any extension module. If administrative server 110 does not find any such usage, then administrative server 110 sends a "deactivate" message to each of access management servers 120A-N. In response to receiving this message, access management servers 120A-N unload the plug-in from their respective JVMs using the class loader corresponding specifically to that plug-in. Again, the plug-in-specific class loader is maintained by the OSGI framework implementation. Upon successful unloading of the plug-in, an access management server sends a "deactivate success" message to administrative server 110. After administrative server 110 receives "deactivate success" messages from all of the operating access management servers 120A-N in cluster 100, administrative server 110 updates the status of the plug-in to deactivated state 208 in the configuration store. If even one of access management servers 120A-N returns a "deactivate failed" message, administrative server 110 sets the status of the plug-in to be deactivate_failed state 216.

The "remove" command can be invoked relative to a plug-in if that plug-in is in any state other than activated state 206 or deactivate_failed state 216. This command causes the target plug-in code to be removed from all of access management servers 120A-N and administrative server 110. The code can be stored elsewhere for audit purposes. Administrative server 110 sends a "remove" message to each of access management servers 120A-N. In response to receiving this message, access management servers 120A-N remove the plug-in from their storage subsystems. Upon successful removal of the plug-in code, an access management server sends a "remove success" message to administrative server 110. After administrative server 110 receives "remove success" messages from all of the operating access management servers 120A-N in cluster 100, administrative server 110 then removes the plug-in code from its own storage subsystem (potentially storing that code elsewhere, e.g., a backup drive) and updates the status of the plug-in to removed state 210 in the configuration store. If even one of access management servers 120A-N returns a "remove_failed" message, administrative server 110 sets the status of the plug-in to be remove_failed state 218.

State Transition Command Technique

In one embodiment of the invention, the commands are issued via calls to an application programming interface. In one embodiment of the invention, a plug-in's current state, or status, and the command most recently issued to the plug-in are stored in a configuration store. In one embodiment of the invention, only administrative server 110 is permitted to change data stored in the configuration store. For example, in one embodiment of the invention, only administrative server 110 is permitted to issue commands to access management servers 120A-N, and only administrative server 110 is permitted to change the status of any plug-in in the configuration store. In one embodiment of the invention, administrative server 110 maintains a runtime status of each plug-in for each of access management servers 120A-N in between state transitions. For example, in between the time that administrative server 110 issues a command and the time that administrative server 110 updates a state change in the configuration store, administrative server 110 may maintain a runtime status of the plug-in to which the command was issued until administrative server 110 updates the state for that plug-in in the configuration store.

Figure 3:
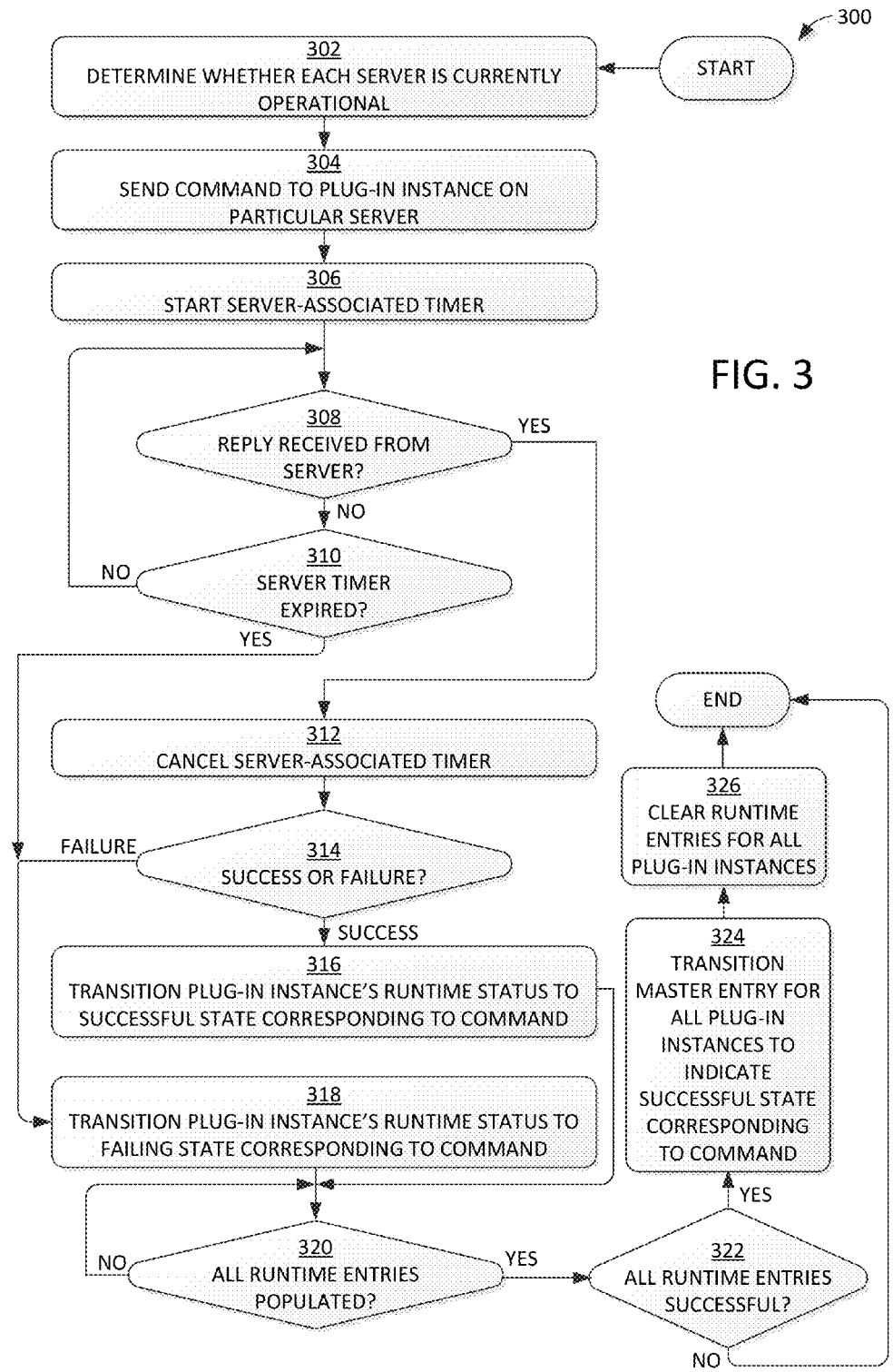
FIG. 3 is a flow diagram that illustrates an example of operations that an administrative server performs relative to plug-ins on access management servers, according to an embodiment of the invention.

FIG. 3 is a flow diagram that illustrates an example of a technique 300 that administrative server 110 performs relative to plug-ins on access management servers 120A-N, according to an embodiment of the invention. In block 302, prior to sending a message, administrative server 110 checks each of access management servers 120A-N to determine whether than access management server is up or down (i.e., currently operational or not).

In one embodiment of the invention, administrative server 110 performs the operations of various ones of blocks 304-318 relative to each one of access managements servers 120A-N that is currently operational. These operations may be performed concurrently relative to access management servers 120A-N. Thus, operations that involve administrative server 110 sending a command to a plug-in may involve administrative server 110 sending that command concurrently to each instance of that plug-in on all of access management servers 120A-N that are currently operational.

In block 304, administrative server 110 sends a message, specifying a command (e.g., upload, distribute, activate, deactivate, or remove), to an instance of the particular plug-in on a particular one of one of access management servers 120A-N. In block 306, upon sending the message, administrative server 110 starts a configurable timer that is specific to the particular access management server to which the message was sent. In block 308, administrative server 110 determines whether a reply has been received from the particular access management server. If a reply has been received, then control passes to block 312. Otherwise, control passes to block 310.

In block 310, administrative server 110 determines whether the timer for the particular access management server has expired. If the timer has expired, then control passes to block 318. Otherwise, control passes back to block 308.

In block 312, administrative server 110 cancels the timer for the particular access management server. In block 314, administrative server 110 determines whether the reply indicates success or failure of the command relative to that instance of the particular plug-in. If the reply indicates success, then control passes to block 316. Alternatively, if the reply indicates failure, the control passes to block 318.

In block 316, administrative server 110 updates, in the configuration store, a runtime state entry corresponding to the instance of the particular plug-in on the particular access management server. Administrative server 110 updates a runtime status indicated in that entry to reflect a new state to which the successful performance of the command caused the instance of the particular plug-in on the particular access management server to transition. For example, if the command was "distribute," then administrative server 110 changes the runtime status of the instance of the particular plug-in on the particular access management server to "distributed." Control passes to block 320.

Alternatively, in block 318, administrative server 110 updates, in the configuration store, a runtime state entry corresponding to the instance of the particular plug-in on the particular access management server. Administrative server 110 updates a runtime status indicated in that entry to reflect a new state to which the failure to perform the command caused the instance of particular plug-in on the particular access management server to transition. For example, if the command was "distribute," then administrative server 110 changes the runtime status of the instance of the particular plug-in on the particular access management server to "distribute_failed." Control passes to block 320.

In block 320, administrative server 110 determines whether all of the runtime entries for all instances of the particular plug-in on each of currently operational access management servers 120A-N indicate a transition (due to success or failure) from their previous runtime states. If all of the timers on all of currently operational access management servers all of the runtime entries for all instances of the particular plug-in on each of access management servers 120A-N indicate a transition (due to success or failure) from their previous runtime states, then control passes to block 322. Otherwise, control passes back to block 320, while administrative server 110 waits for one or more runtime entries to indicate a transition from previous runtime states.

In block 322, administrative server 110 determines whether all of the runtime states for all instances of the particular plug-in on all of currently operational access management servers 120A-N indicate a successful transition. If all of the runtime states for all instances of the particular plug-in indicate a successful transition, then control passes to block 324. Otherwise, technique 300 terminates.

In block 324, administrative server 110 updates, in the configuration store, a master entry for the particular plug-in (including all instances thereof). Administrative server 110 updates the master entry to indicate a new state resulting from the successful transition from the previous state. In block 326, administrative server 110 clears all of the runtime entries for all of the particular plug-ins. Technique 300 then terminates.

In one embodiment of the invention, the configuration store and a plug-in repository (which also resides on administrative server 110, in one embodiment) are synchronized whenever a previously non-operational one of access management servers 120A-N becomes operational within cluster 100. That particular access management server picks up, from the master entries in configuration store, the statuses of the plug-ins residing on that particular access management server.

In one embodiment of the invention, whenever a new one of access management servers 120A-N starts up, all plug-ins having a status of "activated" in the master entries stored in the configuration store are loaded into the JVM on that access management server using the OSGI framework. Therefore, technique 300 functions properly even when one or more of access management servers 120A-N are down, and even if a new access management server is started up within cluster 100.

Messaging and Distribution

In one embodiment of the invention, a messaging mechanism and a distribution mechanism use a shared memory location called a channel. Each channel is identified by a unique name. A channel may be shared by multiple access management servers 120A-N for performing various actions. In one embodiment of the invention, events and actions that can be performed on a channel include: write/update, read, remove, and obtain lock (a distributed read/write lock). In one embodiment of the invention, event listeners and action listeners can be registered to a channel for the following actions and events: write/update, read, and remove. In one embodiment of the invention, listeners are notified or triggered whenever a corresponding action or event occurs.

In one embodiment of the invention, the distribution mechanism makes use of a single channel called the "distribution channel" for distributing plug-in jar files to access management servers 120A-N. These servers register write/update event listeners for the distribution channel. Administrative server 110 obtains a lock on the channel and writes to the channel with the plug-in jar file. Each of access management servers 120A-N is notified of the write/update event, and each such server reads the channel to copy the plug-in jar file to a specified location called the "plug-in repository." Upon successfully copying the plug-in jar file, access management servers 120A-N use the messaging mechanism discussed below to send a message to administrative server 110A, updating the plug-in state for those servers to distributed state 204. After administrative server 110A determines that all of access management servers 120A-N have indicated that they are in distributed state 204, administrative server 110A updates the status of the plug-in in the master entry in the configuration store to distributed state 204.

In one embodiment of the invention, one plug-in jar file is distributed at a time. In such an embodiment, the plug-in jar file is not removed from the channel. The channel is updated with a new plug-in jar file for the next "distribute" command.

In one embodiment of the invention, a messaging mechanism uses N+1 channels for sending and receiving messages, where N is the quantity of access management servers 120A-N.

Each server in cluster 100 registers a write/update event listener for that server's own channel. That channel is called the "node channel." Each node channel maintains a queue data structure for messages written to that node channel. When a message-generating server tries to send a message to a message-receiving server, the message-generating server first obtains a lock on the node channel of the message-receiving node and writes the message to that node channel afterward. The message-generating server obtains a lock on its own node channel and removes the queue of messages therein to process those messages. If a notification for a message in the queue arrives after the queue has been removed, such that the queue for the node channel is empty, then the notification is ignored since the message has already been processed. This phenomenon may occur when more than one server attempts to write to a message-receiving server's node channel in sufficiently close succession. Removing and processing an entire queue at a time, rather than one message per notification, ensures faster processing of the messages. In one embodiment of the invention, each message contains details about the sender and therefore can be tracked without waiting for its corresponding notification to arrive at the receiver's end. This feature may help to clear queues in case of lost event notifications.

In one embodiment of the invention, administrative server 110 uses the messaging mechanism to send command messages to access management servers 120A-N. Access management servers 120A-N perform the command actions specified in the messages upon receiving those messages. After completing a command action, access management servers 120A-N send back a command status message to administrative server 110. Administrative server 110 maintains the status of each such server for the current command for a particular plug-in. Upon receiving a command status message from one of access management servers 120A-N, administrative server 110 updates the runtime plug-in state in the runtime entry for that access management server.

Access Management System

Figure 5:
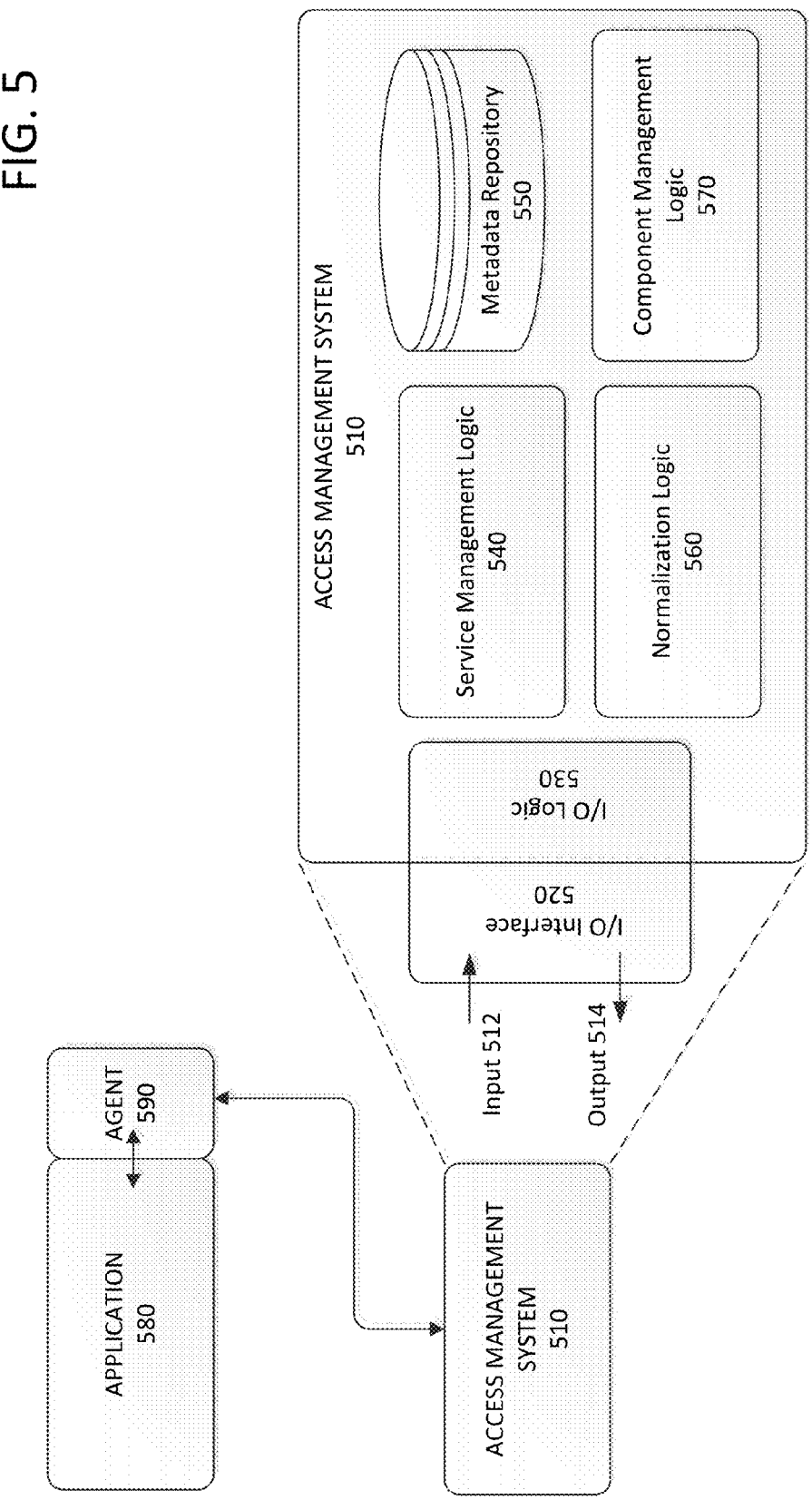
FIG. 5 is a simplified block diagram illustrating an access management system on which an embodiment of the invention may be implemented.

FIG. 5 is a simplified block diagram illustrating an access management system 510 on which an embodiment may be implemented. Such a system may be implemented within any of access management servers 120A-N, for example. In the embodiment shown in FIG. 5, access management system 510 is a collection of entities 530, 540, 550, 560, and 570, each of which may be implemented in logic such as software logic, hardware logic, or any combination thereof. Access management system 510 includes an input/output (I/O) interface 520 in an embodiment. In another embodiment, I/O interface 520 is not part of access management system 510, but is coupled to access management system 510. I/O interface 520 may be configured to couple access management system 510 to a network or a user input device such as a keyboard, mouse, or any other user input device. I/O interface 520 may also be configured to access management system 510 to other devices or means of providing or interpreting signals or data such as an input 512, including a network, display device, or transmission media device capable of transmitting or displaying an output 514. In an embodiment, I/O interface 520 may represent multiple I/O interfaces.

Input 512 may include input from a web application such as application 580 or an agent such as agent 590 in an embodiment. Agent 590 may be configured to intercept access requests from a user such as an access request issued from a user's web browser software or other software or hardware. These requests may be directed in whole or in part to access management system 510 in the form of input 512.

In an embodiment, access management system 510 includes an I/O logic 530 configured to receive input 512 from I/O interface 520. I/O logic 530 may be configured to store input 512 or information associated with input 512 in non-transitory media, such as volatile or non-volatile storage media. For example, I/O logic 523 may include logging logic. I/O logic 523 is communicatively coupled to service management logic 540, metadata repository 550, normalization logic 540, and component management logic 540 in an embodiment.

In an embodiment, service management logic 540. Service management logic 540 manages service entities associated with a service entities layer. These service entities may include protocol-specific listeners that listen for requests of a particular type, for example. When a request is received by a service entity, that request is passed to normalization logic 560 in an embodiment.

In an embodiment, access management system 510 includes normalization logic 560. Normalization logic 560 implements the features discussed above with respect to a protocol binding layer. Normalization logic 560 receives protocol-specific requests from service management logic 540 in an embodiment. Normalization logic 560 then normalizes the request by providing only non-protocol-specific information to component management logic. In addition, normalization logic 560 may provide metadata from metadata repository 550 to a component management system in order to describe the response details expected from component management engine 570 in response to the normalized request. As used herein, the term "normalized request" is a request that is different than the original request on which the normalized request is based. Metadata repository 550 is used to store metadata and other data in an embodiment.

In an embodiment, access management system 510 includes component management logic 570. Component management system 570 orchestrates the performance of all activities associated with incoming requests. Specifically, component management system determines, based on the information provided by normalization logic, which functional components are required to satisfy a request, and directs those components to perform their respective functions. Additional details pertaining to an example of access management system 510 are disclosed in U.S. patent application Ser. No. 13/464,906, titled "Access Management Architecture," which is incorporated by reference herein for all purposes.

Hardware Overview

Figure 6:
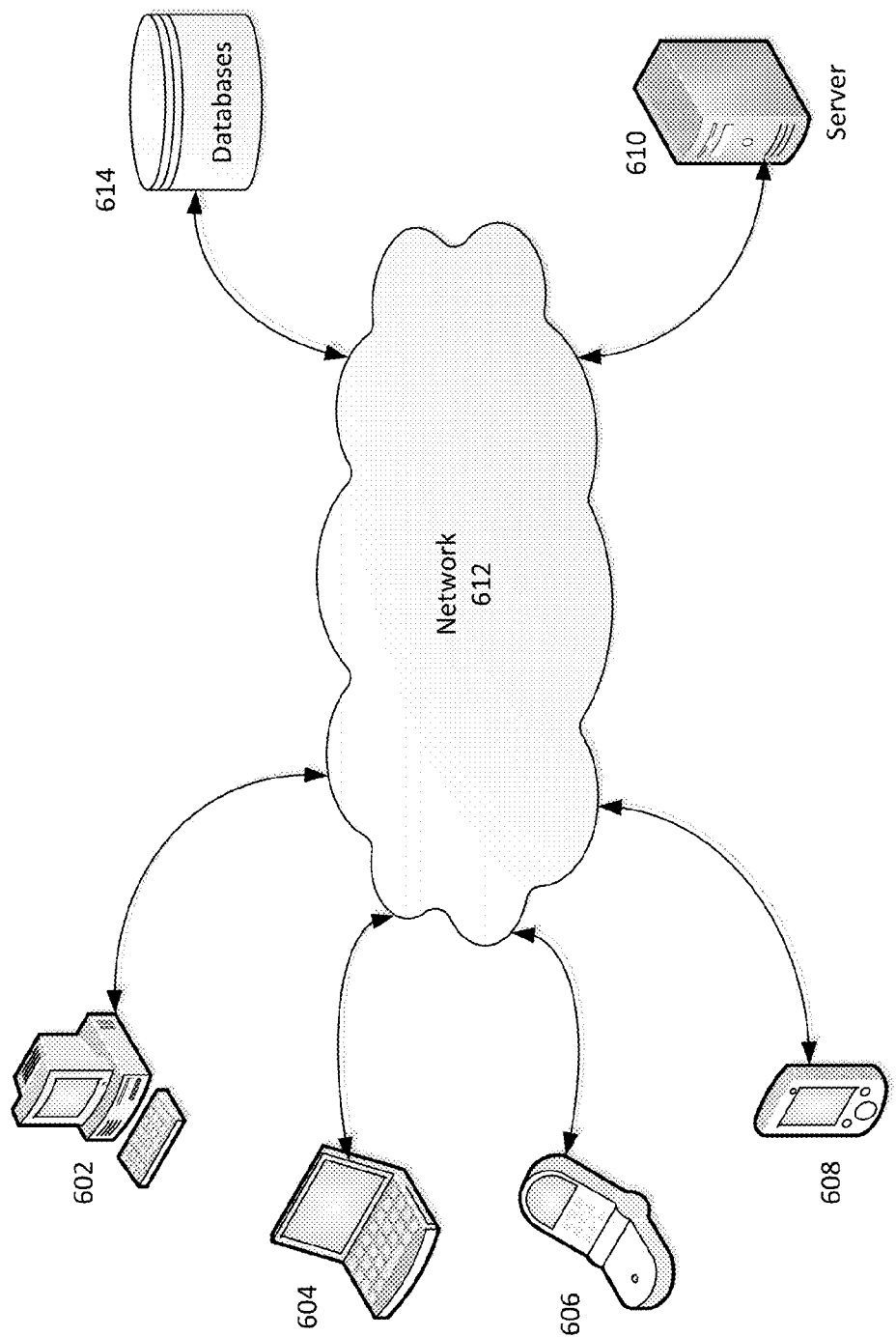
FIG. 6 is a simplified block diagram illustrating physical components of a system environment that may be used in accordance with an embodiment of the present invention.

FIG. 6 is a simplified block diagram illustrating physical components of a system environment 600 that may be used in accordance with an embodiment of the present invention. This diagram is merely an example, which should not unduly limit the scope of the claims. One of ordinary skill in the art would recognize many variations, alternatives, and modifications.

As shown, system environment 600 includes one or more client-computing devices 602, 604, 606, 608 communicatively coupled with a server computer 610 via a network 612. In one set of embodiments, client-computing devices 602, 604, 606, 608 may be configured to run one or more components of a graphical interface described above.

Client-computing devices 602, 604, 606, 608 may be general purpose personal computers (including, for example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, and/or other communication protocol enabled), and/or workstation computers running any of a variety of commercially-available UNIX or UNIX-like operating systems (including without limitation the variety of GNU/Linux operating systems). Alternatively, client-computing devices 602, 604, 606, and 608 may be any other electronic devices capable of communicating over a network (e.g., network 612 described below) with server computer 610. Although system environment 600 is shown with four client-computing devices and one server computer, any number of client-computing devices and server computers may be supported.

Server computer 610 may be a general-purpose computer, specialized server computer (including, e.g., a LINUX server, UNIX server, mid-range server, mainframe computer, rack-mounted server, etc.), server farm, server cluster, or any other appropriate arrangement and/or combination. Server computer 610 may run an operating system including any of those discussed above, as well as any commercially available server operating system. Server computer 610 may also run any of a variety of server applications and/or mid-tier applications, including web servers, JAVA virtual machines, application servers, database servers, and the like. In various embodiments, server computer 610 is adapted to run one or more Web services or software applications that provide the diagnostics functionality described above. For example, server computer 610 may be configured to execute the various methods described in the various flowcharts described above.

As shown, client-computing devices 602, 604, 606, 608 and server computer 610 are communicatively coupled via network 612. Network 612 may be any type of network that can support data communications using any of a variety of commercially-available protocols, including without limitation TCP/IP, SNA, IPX, AppleTalk, and the like. Merely by way of example, network 612 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth protocol known in the art, and/or any other wireless protocol); and/or any combination of these and/or other networks. In various embodiments, the client-computing devices 602, 604, 606, 608 and server computer 610 are able to access the database 614 through the network 612. In certain embodiments, the client-computing devices 602, 604, 606, 608 and server computer 610 each has its own database.

System environment 600 may also include one or more databases 614. Database 614 may correspond to an instance of integration repository as well as any other type of database or data storage component described in this disclosure. Database 614 may reside in a variety of locations. By way of example, database 614 may reside on a storage medium local to (and/or resident in) one or more of the computers 602, 604, 606, 608, 610. Alternatively, database 614 may be remote from any or all of the computers 602, 604, 606, 608, 610 and/or in communication (e.g., via network 612) with one or more of these. In one set of embodiments, database 614 may reside in a storage-area network (SAN) familiar to those skilled in the art. Similarly, any necessary files for performing the functions attributed to the computers 602, 604, 606, 608, 610 may be stored locally on the respective computer and/or remotely on database 614, as appropriate. In one set of embodiments, database 614 is a relational database, such as Oracle 11g available from Oracle Corporation that is adapted to store, update, and retrieve data in response to SQL-formatted commands. In various embodiments, database 614 stores data that is used for providing diagnostic capabilities as described above.

Figure 7:
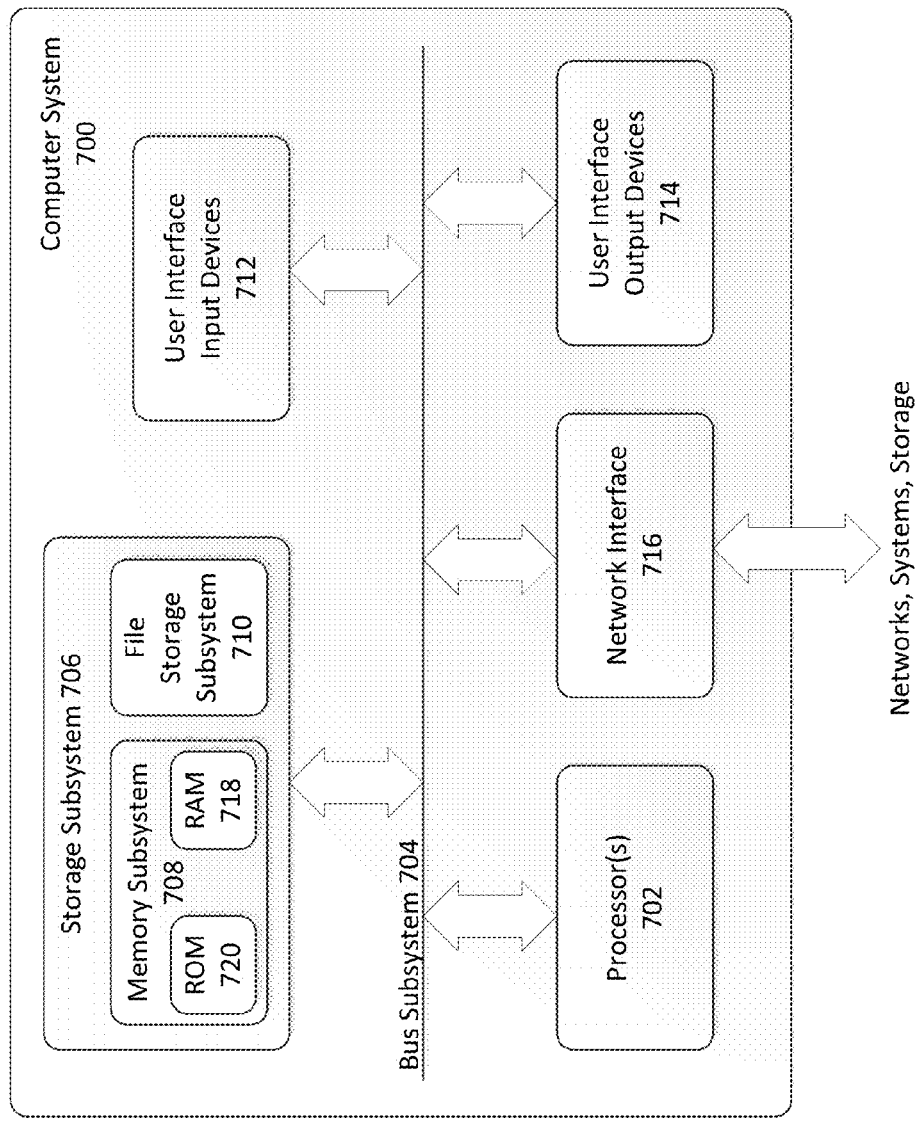
FIG. 7 is a simplified block diagram of a computer system that may be used to practice an embodiment of the present invention.

FIG. 7 is a simplified block diagram of a computer system that may be used to practice an embodiment of the present invention. Computer system 700 may serve as any of the servers depicted in FIG. 1. In various embodiments, computer system 700 may be used to implement any of the computers 602, 604, 606, 608, 610 illustrated in system environment 600 described above. As shown in FIG. 7, computer system 700 includes a processor 702 that communicates with a number of peripheral subsystems via a bus subsystem 704. These peripheral subsystems may include a storage subsystem 706, comprising a memory subsystem 708 and a file storage subsystem 710, user interface input devices 712, user interface output devices 714, and a network interface subsystem 716.

Bus subsystem 704 provides a mechanism for letting the various components and subsystems of computer system 700 communicate with each other as intended. Although bus subsystem 704 is shown schematically as a single bus, alternative embodiments of the bus subsystem may utilize multiple busses.

Network interface subsystem 716 provides an interface to other computer systems, networks, and portals. Network interface subsystem 716 serves as an interface for receiving data from and transmitting data to other systems from computer system 700.

User interface input devices 712 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 700.

User interface output devices 714 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 provides a non-transitory computer-readable storage medium for storing the basic programming and data constructs that provide the functionality of the present invention. Software (programs, code modules, instructions) that when executed by a processor provide the functionality of the present invention may be stored in storage subsystem 706. These software modules or instructions may be executed by processor(s) 702. Storage subsystem 706 may also provide a repository for storing data used in accordance with the present invention. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 700 can be of various types including a personal computer, a portable computer, a workstation, a network computer, a mainframe, a kiosk, a server or any other data processing system. Due to the ever-changing nature of computers and networks, the description of computer system 700 depicted in FIG. 7 is intended only as a specific example for purposes of illustrating the preferred embodiment of the computer system. Many other configurations having more or fewer components than the system depicted in FIG. 7 are possible.

What is claimed is:

1. A method, comprising:
maintaining, on an administrative server, a configuration store containing a plurality of entries associated with a plug-in, each entry of the plurality of entries associating the plug-in with a runtime state for that plug-in, the plurality of entries comprising:
a plurality of instance entries corresponding to a plurality of access management servers, each instance entry associating a runtime state with an instance of the plug-in executing on a particular access management server; and
a master entry for the plug-in, the master entry associating a most recent runtime state applicable to all of the instances of the plug-in executing on all of the plurality of access management servers;
receiving, at the administrative server, a command to transition runtime states of each instance of a plug-in from a first runtime state to a second runtime state;
in response to receiving the command, sending, from the administrative server to each of the plurality of access management servers, an instruction to transition a runtime state of a plug-in instance associated with that access management server from the first runtime state to the second runtime state;
receiving, at the administrative server, from each of two or more access management servers of the plurality of access management servers, a reply indicating whether a plug-in instance successfully transitioned from the first runtime state to the second runtime state;
determining whether replies indicating a successful transition from the first runtime state to the second runtime state have been received from all of the plurality of access management servers; and
in response to a determination that replies indicating a successful transition from the first runtime state to the second runtime state have been received from all of the plurality of access management servers:
updating the master entry for the plug-in; and
clearing each of the plurality of instance entries for the plug-in, corresponding to each of the plurality of access management servers.

2. The method of claim 1, further comprising:
receiving, at the administrative server, from each particular access management server of the plurality of access management servers, a reply that indicates whether that particular access management server successfully copied a particular plug-in from the administrative server to storage of that particular access management server;
determining, at the administrative server, whether replies indicating successful copying of the particular plug-in have been received from all access management servers of the plurality of access management servers; and
in response to a determination that replies indicating successful copying of the particular plug-in have been received from all access management servers of the plurality of access management servers, updating, at the administrative server, a runtime state for the particular plug-in to indicate that the particular plug-in has been distributed to all access management servers of the plurality of access management servers.

3. The method of claim 1, further comprising:
receiving, at the administrative server, from each particular access management server of the plurality of access management servers, a reply that indicates whether that particular access management server successfully loaded code for a particular plug-in into a virtual machine that is executing on that particular access management server;
determining, at the administrative server, whether replies indicating successful loading of code for the particular plug-in into a virtual machine have been received from all access management servers of the plurality of access management servers; and
in response to a determination that replies indicating successful loading of code for the particular plug-in into a virtual machine have been received from all access management servers of the plurality of access management servers, updating, at the administrative server, a runtime state for the particular plug-in to indicate that instances of the particular plug-in have been activated on all access management servers of the plurality of access management servers.

4. The method of claim 1, further comprising:
receiving, at the administrative server, from each particular access management server of the plurality of access management servers, a reply that indicates whether that particular access management server successfully unloaded code for a particular plug-in from a virtual machine that is executing on that particular access management server;
determining, at the administrative server, whether replies indicating successful unloading of code for the particular plug-in from a virtual machine have been received from all access management servers of the plurality of access management servers; and
in response to a determination that replies indicating successful unloading of code for the particular plug-in from a virtual machine have been received from all access management servers of the plurality of access management servers, updating, at the administrative server, a runtime state for the particular plug-in to indicate that instances of the particular plug-in have been deactivated on all access management servers of the plurality of access management servers.

5. The method of claim 1, further comprising:
receiving, at the administrative server, from each particular access management server of the plurality of access management servers, a reply that indicates whether that particular access management server successfully deleted code for a particular plug-in from storage of that particular access management server;
determining, at the administrative server, whether replies indicating successful deleting of code for the particular plug-in from an access management server's storage have been received from all access management servers of the plurality of access management servers; and
in response to a determination that replies indicating successful deleting of code for the particular plug-in from an access management server's storage have been received from all access management servers of the plurality of access management servers, updating, at the administrative server, a runtime state for the particular plug-in to indicate that instances of the particular plug-in have been removed from all access management servers of the plurality of access management servers.

6. The method of claim 1, further comprising:
receiving, at the administrative server, from each particular access management server of the plurality of access management servers, a reply that indicates whether that particular access management server successfully copied a particular plug-in from the administrative server to that particular access management server;
determining, at the administrative server, whether a reply indicating unsuccessful copying of the particular plug-in has been received from any access management server of the plurality of access management servers; and
in response to a determination that a reply indicating unsuccessful copying of the particular plug-in has been received from any access management server of the plurality of access management servers, updating, at the administrative server, a runtime state for the particular plug-in to indicate failure of distribution of the particular plug-in to all access management servers of the plurality of access management servers.

7. The method of claim 1, further comprising:
receiving, at the administrative server, from each particular access management server of the plurality of access management servers, a reply that indicates whether that particular access management server successfully loaded code for a particular plug-in into a virtual machine that is executing on that particular access management server;
determining, at the administrative server, whether a reply indicating unsuccessful loading of code for the particular plug-in into a virtual machine has been received from any access management server of the plurality of access management servers; and
in response to a determination that replies indicating unsuccessful loading of code for the particular plug-in into a virtual machine has been received from any access management server of the plurality of access management servers, updating, at the administrative server, a runtime state for the particular plug-in to indicate failure of activation of the particular plug-in on all access management servers of the plurality of access management servers.

8. The method of claim 1, further comprising:
receiving, at the administrative server, a particular command to upload a particular plug-in to the administrative server;
in response to receiving the particular command, performing validation of the particular plug-in at the administrative server, wherein the validation involves checks for compatibility, versioning, and security risk; and
in response to performance of successful validation of the particular plug-in, creating, in the configuration store, an entry that associates the particular plug-in to a runtime state representing that the particular plug-in has been uploaded to the administrative server.

9. The method of claim 1, further comprising:
receiving, at the administrative server, a particular command to distribute a particular plug-in to the plurality of access management servers;
in response to receiving the particular command, determining whether the plurality of entries associates the particular plug-in with either (a) a runtime state that indicates that the particular plug-in has been uploaded to the administrative server or (b) a runtime state that indicates failure of distribution of the particular plug-in to all access management servers of the plurality of access management servers; and in response to a determination that the plurality of entries do not associate the particular plug-in with either (a) a runtime state that indicates that the particular plug-in has been uploaded to the administrative server or (b) a runtime state that indicates failure of distribution of the particular plug-in to all access management servers of the plurality of access management servers, preventing execution of the particular command.

10. The method of claim 1, further comprising:
receiving, at the administrative server, a particular command to activate instances of a particular plug-in on each access management server of the plurality of access management servers;
in response to receiving the particular command, determining whether at least one access management server of the plurality of access management servers is operational;
in response to receiving the particular command, determining whether the plurality of entries associates the particular plug-in with (a) a runtime state that indicates that the particular plug-in has been distributed to all access management servers of the plurality of access management servers, (b) a runtime state that indicates failure of activation of the particular plug-in on all access management servers of the plurality of access management servers, or (c) a runtime state that indicates that instances of the particular plug-in have been deactivated on all access management servers of the plurality of access management servers; and
in response to a determination that at least one access management server of the plurality of access management servers is operational and that the plurality of entries associates the particular plug-in with (a) a runtime state that indicates that the particular plug-in has been distributed to all access management servers of the plurality of access management servers, (b) a runtime state that indicates failure of activation of the particular plug-in on all access management servers of the plurality of access management servers, or (c) a runtime state that indicates that instances of the particular plug-in have been deactivated on all access management servers of the plurality of access management servers, instructing each particular access management server of the plurality of access management servers to load code for the particular plug-in into a virtual machine that is executing on that particular access management server.

11. The method of claim 1, further comprising:
receiving, at the administrative server, a particular command to deactivate instances of a particular plug-in on each access management server of the plurality of access management servers;
in response to receiving the particular command, determining whether any extension module is currently using the particular plug-in;
in response to receiving the particular command, determining whether the plurality of entries associates the particular plug-in with either (a) a runtime state that indicates that instances of the particular plug-in have been activated on all access management servers of the plurality of access management servers or (b) a runtime state that indicates failure of deactivation of the particular plug-in on all access management servers of the plurality of access management servers; and
in response to a determination that no extension module is currently using the particular plug-in and that the plurality of entries associates the particular plug-in to either (a) a runtime state that indicates that instances of the particular plug-in have been activated on all access management servers of the plurality of access management servers or (b) a runtime state that indicates failure of deactivation of the particular plug-in on all access management servers of the plurality of access management servers, instructing each particular access management server of the plurality of access management servers to unload code for the particular plug-in from a virtual machine that is executing on that particular access management server.

12. The method of claim 1, further comprising:
receiving, at the administrative server, a particular command to remove instances of a particular plug-in on each access management server of the plurality of access management servers;
in response to receiving the particular command, determining whether the plurality of entries associates the particular plug-in with either (a) a runtime state that indicates that instances of the particular plug-in have been activated on all access management servers of the plurality of access management servers or (b) a runtime state that indicates failure of deactivation of the particular plug-in on all access management servers of the plurality of access management servers;
in response to a determination that the plurality of entries does not associate the particular plug-in with either (a) a runtime state that indicates that instances of the particular plug-in have been activated on all access management servers of the plurality of access management servers or (b) a runtime state that indicates failure of deactivation of the particular plug-in on all access management servers of the plurality of access management servers, performing operations comprising:
  instructing each particular access management server of the plurality of access management servers to delete code for the particular plug-in from storage of that particular access management server,
  storing code for the particular plug-in on a backup storage device, and
  deleting code for the particular plug-in from storage of the administrative server.

13. The method of claim 1, further comprising:
in response to receiving the command, starting a timer;
in response to detecting expiration of the timer, determining whether replies indicating successful performance of the instruction have been received at the administrative server from each access management server of the plurality of access management servers; and
in response to a determination that the administrative server has not received, from at least one access management server of the plurality of access management servers, a reply indicating successful performance of the instruction by the expiration of the time, updating the configuration store to reflect a failure to transition the runtime states of each instance of the plug-in to the second runtime state.

14. The method of claim 1, further comprising:
detecting that a new access management server has been added to the plurality of access management servers; and
in response to detecting addition of the new access management server to the plurality of access management servers, causing the new access management server to load, into a virtual machine executing on the new access management server, code for each particular plug-in that the plurality of entries associates with a runtime state that indicates that instances of the particular plug-in have been activated on all access management servers of the plurality of access management servers.

15. A non-transitory computer-readable storage memory storing instructions executable by one or more processors to cause the one or more processors to perform operations comprising:
maintaining a configuration store containing a plurality of entries associated with a plug-in, each entry of the plurality of entries associating the plug-in with a runtime state for that plug-in, the plurality of entries comprising:
a plurality of instance entries corresponding to a plurality of access management servers, each instance entry associating a runtime state with an instance of the plug-in executing on a particular access management server; and
a master entry for the plug-in, the master entry associating a most recent runtime state applicable to all of the instances of the plug-in executing on all of the plurality of access management servers;
receiving a command to transition runtime states of each instance of a plug-in from a first runtime state to a second runtime state;
in response to receiving the command, sending, to each of the plurality of access management servers, an instruction to transition a runtime state of a plug-in instance associated with that access management server from the first runtime state to the second runtime state;
receiving, from each of two or more access management servers of the plurality of access management servers, a reply indicating whether a plug-in instance successfully transitioned from the first runtime state to the second runtime state;
determining whether replies indicating a successful transition from the first runtime state to the second runtime state have been received from all of the plurality of access management servers; and
in response to a determination that replies indicating a successful transition from the first runtime state to the second runtime state have been received from all of the plurality of access management servers:
updating the master entry for the plug-in; and
clearing each of the plurality of instance entries for the plug-in, corresponding to each of the plurality of access management servers.

16. The computer-readable storage memory of claim 15, storing furhter instructions executable by the one or more processors to cause the one or more processors to perform operations comprising:
in response to receiving the command, starting a timer;
in response to detecting expiration of the timer, determining whether replies indicating successful performance of the instruction have been received at the administrative server from each access management server of the plurality of access management servers; and
in response to a determination that the administrative server has not received, from at least one access management server of the plurality of access management servers, a reply indicating successful performance of the instruction by the expiration of the time, updating the configuration store to reflect a failure to transition the runtime states of each instance of the plug-in to the second runtime state.

17. A system, comprising:
a plurality of access management servers, each said access management server comprising at least one processor and a memory subsystem; and
an administrative server comprising:
a processing unit comprising one or more processors; and
memory coupled with and readable by the processing unit and storing therein a set of instructions which, when executed by the processing unit, causes the system to:
maintain a configuration store containing a plurality of entries associated with a plug-in, each entry of the plurality of entries associating the plug-in with a runtime state for that plug-in, the plurality of entries comprising:
a plurality of instance entries corresponding to a plurality of access management servers, each instance entry associating a runtime state with an instance of the plug-in executing on a particular access management server; and
a master entry for the plug-in, the master entry associating a most recent runtime state applicable to all of the instances of the plug-in executing on all of the plurality of access management servers;
receive a command to transition states of each instance of a plug-in from a first runtime state to a second runtime state;
in response to receiving the command, send, to each of the plurality of access management servers, an instruction to transition a runtime state of a plug-in instance associated with that access management server from the first runtime state to the second runtime state;
receive, from each of two or more access management servers of the plurality of access management servers, a reply indicating whether a plug-in instance successfully transitioned from the first runtime state to the second runtime state;
determine whether replies indicating a successful transition from the first runtime state to the second runtime state have been received from all of the plurality of access management servers; and
in response to a determination that replies indicating a successful transition from the first runtime state to the second runtime state have been received from all of the plurality of access management servers:
updating the master entry for the plug-in; and
clearing each of the plurality of instance entries for the plug-in, corresponding to each of the plurality of access management servers.

18. The system of claim 17, the memory of the administrative server storing therein additional instructions which, when executed by the processing unit, causes the system to:
detecting that a new access management server has been added to the plurality of access management servers; and
in response to detecting addition of the new access management server to the plurality of access management servers, causing the new access management server to load, into a virtual machine executing on the new access management server, code for each particular plug-in that the plurality of entries associates with a runtime state that indicates that instances of the particular plug-in have been activated on all access management servers of the plurality of access management servers.

19. The system of claim 17, the memory of the administrative server storing therein additional instructions which, when executed by the processing unit, causes the system to:
in response to receiving the command, starting a timer;

in response to detecting expiration of the timer, determining whether replies indicating successful performance of the instruction have been received at the administrative server from each access management server of the plurality of access management servers; and in response to a determination that the administrative server has not received, from at least one access management server of the plurality of access management servers, a reply indicating successful performance of the instruction by the expiration of the time, updating the configuration store to reflect a failure to transition the runtime states of each instance of the plug-in to the second runtime state.

20. The system of claim 17, the memory of the administrative server storing therein additional instructions which, when executed by the processing unit, causes the system to:

detecting that a new access management server has been added to the plurality of access management servers; and in response to detecting addition of the new access management server to the plurality of access management servers, causing the new access management server to load, into a virtual machine executing on the new access management server, code for each particular plug-in that the plurality of entries associates with a runtime state that indicates that instances of the particular plug-in have been activated on all access management servers of the plurality of access management servers.

* * * * *